United States Patent
Jungmann et al.

(10) Patent No.: US 9,453,545 B2
(45) Date of Patent: Sep. 27, 2016

(54) DISK BRAKE AND ADJUSTING DEVICE FOR A DISK BRAKE

(71) Applicant: WABCO Radbremsen GmbH, Mannheim (DE)

(72) Inventors: Hans-Christian Jungmann, Gorxheimertal (DE); Marcus Keller, Weinheim (DE)

(73) Assignee: WABCO RADBREMSEN GMBH, Mannheim (DE)

( * ) Notice: Subject to any disclaimer, the term of this patent is extended or adjusted under 35 U.S.C. 154(b) by 351 days.

(21) Appl. No.: 14/062,214

(22) Filed: Oct. 24, 2013

(65) Prior Publication Data

US 2014/0048358 A1 Feb. 20, 2014

Related U.S. Application Data

(62) Division of application No. 13/058,186, filed as application No. PCT/EP2009/005581 on Jul. 31, 2007, now Pat. No. 8,590,675.

(30) Foreign Application Priority Data

Aug. 14, 2008 (DE) .................. 10 2008 037 774
Aug. 14, 2008 (DE) .................. 10 2008 037 775

(51) Int. Cl.
*F16D 65/38* (2006.01)
*F16D 65/56* (2006.01)
(Continued)

(52) U.S. Cl.
CPC ............. *F16D 65/567* (2013.01); *F16D 65/18* (2013.01); *F16D 2121/14* (2013.01); *F16D 2125/26* (2013.01); *F16D 2125/32* (2013.01); *F16D 2125/64* (2013.01)

(58) Field of Classification Search
CPC ........ F16D 65/38; F16D 65/52; F16D 65/56; F16D 65/66; F16D 65/567; F16D 2125/40; F16D 2125/20

USPC ........ 188/71.7, 71.9, 72.8, 72.9, 72.7, 196 P, 188/196 D, 196 V
See application file for complete search history.

(56) References Cited

U.S. PATENT DOCUMENTS 3,497,036 A   2/1970 Seip
3,967,705 A   7/1976 Johannesen et al.
(Continued)

FOREIGN PATENT DOCUMENTS

CN   1742170 A   3/2006
CN   1828081 A   9/2006
(Continued)

OTHER PUBLICATIONS

International Search Report and Written Opinion mailed Dec. 14, 2009 for International Application No. PCT/EP2009/005581, 9 pages.
(Continued)

*Primary Examiner* — Robert A Siconolfi
*Assistant Examiner* — Vu Q Nguyen
(74) *Attorney, Agent, or Firm* — Schwabe, Williamson & Wyatt, P.C.

(57) ABSTRACT

The invention relates to a disk brake, in particular for utility vehicles, having a brake application shaft and having an adjusting device for wear-dependent adjustment, wherein a rotational axis of the brake application shaft is perpendicular to a rotational axis of the adjusting device and a pin serves to couple the brake application shaft to the adjusting device. A longitudinal axis of the pin encloses an acute angle with the rotational axis of the brake application shaft. The invention also relates to an adjusting device for a disk brake, in particular for utility vehicles, having an adjusting element in the form of an adjusting nut or an adjusting screw, and having a slipping clutch for limiting the torque which can be transmitted to the adjusting element. The slipping clutch has a friction element which is rotationally coupled to the adjusting element in both rotational directions.

19 Claims, 4 Drawing Sheets

(51) Int. Cl.
*F16D 65/18* (2006.01)
*F16D 121/14* (2012.01)
*F16D 125/26* (2012.01)
*F16D 125/32* (2012.01)
*F16D 125/64* (2012.01)

(56) References Cited

U.S. PATENT DOCUMENTS

| | | | |
|---|---|---|---|
| 4,246,985 | A | 1/1981 | Shimizu et al. |
| 5,433,298 | A | 7/1995 | Antony et al. |
| 5,449,052 | A | 9/1995 | Macke et al. |
| 5,788,022 | A * | 8/1998 | Antony .................. F16D 65/18 188/196 D |
| 5,794,738 | A | 8/1998 | Forni et al. |
| 5,819,884 | A | 10/1998 | Giering |
| 6,820,730 | B2 | 11/2004 | Angerfors |
| 6,997,291 | B2 | 2/2006 | Boisseau |
| 2005/0145448 | A1 | 7/2005 | Watanabe et al. |

FOREIGN PATENT DOCUMENTS

| | | |
|---|---|---|
| DE | 3713201 A1 | 10/1988 |
| DE | 4204307 A1 | 8/1993 |
| DE | 4323292 A1 | 1/1995 |
| DE | 19654729 A1 | 7/1999 |
| DE | 10214670 A1 | 10/2003 |
| DE | 102007007493 A1 | 8/2008 |
| EP | 0730107 A2 | 9/1996 |
| EP | 0739459 A1 | 10/1996 |
| EP | 1683986 A1 | 7/2006 |
| WO | 2004059178 A1 | 7/2004 |
| WO | WO2004/059178 A1 | 7/2004 |

OTHER PUBLICATIONS

International Preliminary Report on Patentability mailed Feb. 15, 2011 for International Application No. PCT/EP2009/005581, 9 pages.

* cited by examiner

DISK BRAKE AND ADJUSTING DEVICE FOR A DISK BRAKE

CROSS REFERENCE TO RELATED APPLICATIONS

The present application is a divisional of and claims priority under 35 U.S.C. §120 to U.S. patent application Ser. No. 13/058,186, entitled "DISK BRAKE AND ADJUSTING DEVICE FOR A DISK BRAKE" which is a national phase entry of, and claims priority under 35 U.S.C. §120 to International Patent Application No. PCT/EP2009/005581, filed 31 Jul. 2009, entitled "DISK BRAKE AND ADJUSTING DEVICE FOR A DISK BRAKE," which designates the United States of America and which claims priority to German Patent Application Nos. 10 2008 037 775.9 and 10 2008 037 774.0 both filed 14 Aug. 2008. The entire content and disclosure of which is hereby incorporated by reference in its entirety.

BACKGROUND

The invention concerns, first, a disk brake, especially for utility vehicles, having a brake application shaft and having an adjusting device for wear-dependent adjustment, wherein a rotational axis of the brake application shaft is perpendicular to a rotational axis of the adjusting device and a pin serves to couple the brake application shaft to the adjusting device. Disk brakes of the aforementioned kind are known, for example, from EP 0 730 107 B1. Comparable solutions are shown by EP 0 739 459 B1 and EP 1 683 986 B1.

In the solution per EP 0 730 107 B1, the longitudinal axis of the pin lies parallel to the rotational axis of the brake application shaft. The offset of the longitudinal axis of the pin from the rotational axis of the brake application shaft determines the transmission ratio of the coupling of the brake application shaft to the adjusting device. The larger the offset of the longitudinal axis of the pin relative to the rotational axis of the brake application shaft, the larger the magnitude of the adjustment each time the brake application shaft is activated.

The adjusting device is used for automatic adjusting or readjusting of the clearance. It is crucial how many brake activations are needed in order to adjust a given nominal clearance, for example, when the actual clearance is large on account of excessive brake lining and/or brake disk wear. Furthermore, the clearance should be quickly restored, i.e., with the fewest possible brake activations, after servicing of the brakes, such as a change of linings. Any actual clearance differing too much from the nominal clearance is detrimental to the braking torque in the application/power stroke, because the system must overcome an excessive dead stroke. The maximum activation stroke (dead stroke+application/power stroke) is established or limited, for example, by the inner contour of the caliper. The above remarks apply to all three of the above-mentioned brakes of the prior art, i.e., regardless of whether the adjusting device lies coaxial with a pressing spindle or set off to the side of it.

DE 42 04 307 A1 shows the rotary drive for a spindle of a disk brake for vehicles. Two pins are used to couple a brake application shaft to an adjusting device. The two pins are radially projecting. They are arranged with a slight offset angle from each other in a radial plane. Their ends engage with two recesses, set off from each other in the transverse direction, arranged on a drive lever.

SUMMARY

The invention is based on the problem of modifying the disk brake of EP 0 730 107 B1 so that the adjusting speed is increased and the number of brake activations required for a given degree of adjustment is reduced.

According to the invention, the stated problem is solved in that a longitudinal axis of the pin subtends an acute angle with the rotational axis of the brake application shaft.

Thanks to this positioning of the pin relative to the rotational axis of the brake application shaft, the free end of the pin, which determines the transmission ratio, can have an especially large distance from the rotational axis of the brake application shaft. Whereas with traditional brakes the pin when force is applied moves an a path corresponding to a circular cylindrical surface, the pin according to the invention moves on a path corresponding to a conical surface.

As a result, the degree of adjustment per activation of the brakes is larger and a smaller number of brake activations is needed to achieve a given degree of adjustment. In other words, the adjustment speed is increased.

The invention therefore makes it possible to increase the adjustment speed by simple means, without changes to the structures of the known brakes and especially while preserving their compact size. The angle according to the invention can be 5° to 45°, preferably 10° to 30°, even more preferably 15° to 23°. Again, preferably, the pin is arranged on the brake application shaft.

According to an especially preferred embodiment of the invention, the pin protrudes from the brake application shaft in the radial direction beyond the outer circumference. In this way, the distance of the free end of the pin from the rotational axis of the brake application shaft, which determines the transmission ratio, can be even larger than the radius of the brake application shaft itself, so that especially large adjustment steps are achieved for each brake activation. In the above-mentioned traditional brakes, a projection beyond the outer circumference is not possible, because the pin there lies parallel to the rotational axis of the brake application shaft.

According to another preferred embodiment of the invention, the pin projects into a recess on the adjusting device. This achieves an especially easy coupling. The dimensions of the recess on the one hand and the dimensions of the pin on the other determine a clearance of the brake, according to the invention. In other words, the recess becomes broader than the thickness of the pin, so that the pin engages in the recess with play. This play determines the clearance. According to the invention, the recess preferably has the shape of an axial groove. Again, this configuration is preferred on account of the ease of its realization.

Moreover, it can be provided that one boundary surface of the recess against which the pin bears for the coupling of the adjusting device with the brake application shaft is flat, spherical, or rounded.

The specific configuration of the boundary surface depends on the particular circumstances. It is chosen so that the frictional losses are minimized and/or a seizing is reliably prevented. In particular, in the case of a flat boundary surface, its orientation relative to the rotational axis of the adjusting device (angle of attack) is chosen so that a seizing is reliably prevented. Finally, the invention also creates an adjusting device for the above-described disk brake.

BRIEF DESCRIPTION OF THE DRAWINGS

The invention is explained more closely hereafter by means of a preferred sample embodiment, making reference to the enclosed drawing with additional features. There is shown.

DETAILED DESCRIPTION

Figure 1:
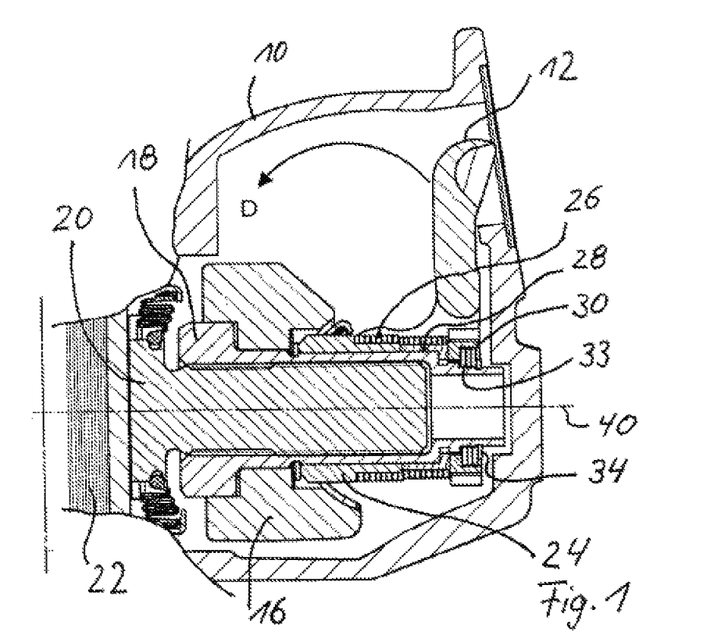
FIG. 1 a partial sectional view of a sample embodiment of the disk brake according to the invention FIG. 2 a perspective view of several features of the brake, FIG. 3 the same parts as FIG. 2, but in top view, and FIG. 4 another partial sectional view of the brake, but rotated by 90° relative to the view of FIG. 1.

The drawing FIG. 1 shows a disk brake. This has a caliper 10. Moreover, it has a brake application device, which includes a pivoting lever 12 with a brake application shaft 14. If the pivoting lever is moved in the direction "D", it exerts pressure on a pressing piece 16, which forms a cross arm of the brake. The pressing piece 16, in turn, presses against a pressing sleeve 18, which then transmits the applied force across a pressing screw 20 to a brake lining 22. Therefore, when the pivoting lever 12 is activated, the brake lining 22 is pressed against a brake disk, not shown in the drawing.

By means of a pin 23, a driving sleeve 24 is coupled to the brake application shaft 14 so that a swinging of the pivoting lever 12 after overcoming a clearance results in a twisting of the driving sleeve. The driving sleeve 24 is coupled by a wrap spring 26, acting as a one-way clutch, to an output sleeve 28. In this way, the output sleeve 28 is also twisted when force is applied, after the clearance is overcome. The output sleeve 28 together with a support disk 30 forms a slipping clutch. Three disk springs 33, thrusting against a retaining ring 34, serve to provide prestressing.

The support disk 30 has an inner contour deviating from a circle shape, while the outer contour of the pressing sleeve 18 in the place where the support disk 30 sits has a complementary outer contour, so that the support disk 30 is rotationally coupled with the pressing sleeve 18 in both directions of turning.

Because of the above individually described couplings of the individual structural parts with each other, a swinging of the pivoting lever 12 in the direction "D" after overcoming the clearance brings about a twisting of the pressing sleeve 18, which is screwed together with the pressing screw 20, so that the pressing screw 20 is backed off from the pressing sleeve 18 to the left in FIG. 1.

But this backing off only occurs until the brake lining 22 thrusts against the brake disk. Then, if further force is applied, the friction between the pressing piece 16 and the pressing sleeve 18 increases, so that the pressing sleeve 18 can no longer turn further. The frictional torque inside the screw connection between the pressing sleeve 18 and the pressing screw 20 that occurs with increasing pressure works in similar fashion. The slipping clutch 28, 30 slips through.

Figure 2:
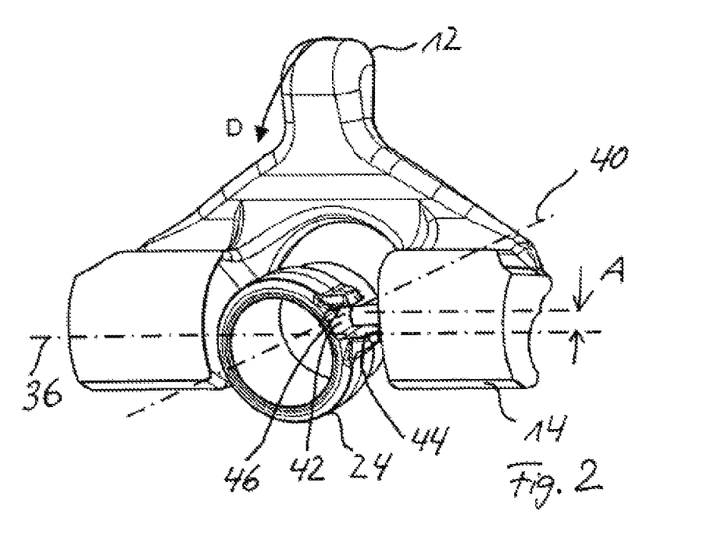
Figure 3:
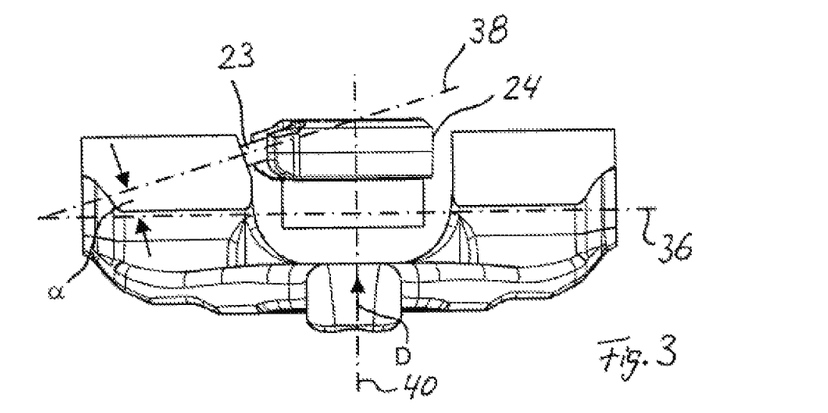

As is especially evident from FIG. 3, the pin 23 is positioned with respect to the rotational axis 36 of the brake application shaft 14. Its longitudinal axis 38 subtends an angle $\alpha=18°$ with the rotational axis 36 in the sample embodiment shown. Therefore, it moves on an imaginary conical envelope surface when activated. As if furthermore evident from FIG. 4, the free end of the pin 23 projects radially beyond the outer circumference of the brake application shaft 14. The distance A per FIG. 2 of the free end of the pin 23 from the rotational axis 36 of the brake application shaft 14 is therefore larger than the radius of the brake shaft. In this way, an especially large transmission ratio can be achieved for coupling the brake application shaft 14 to the adjusting device, especially the driving sleeve 24.

Figure 4:
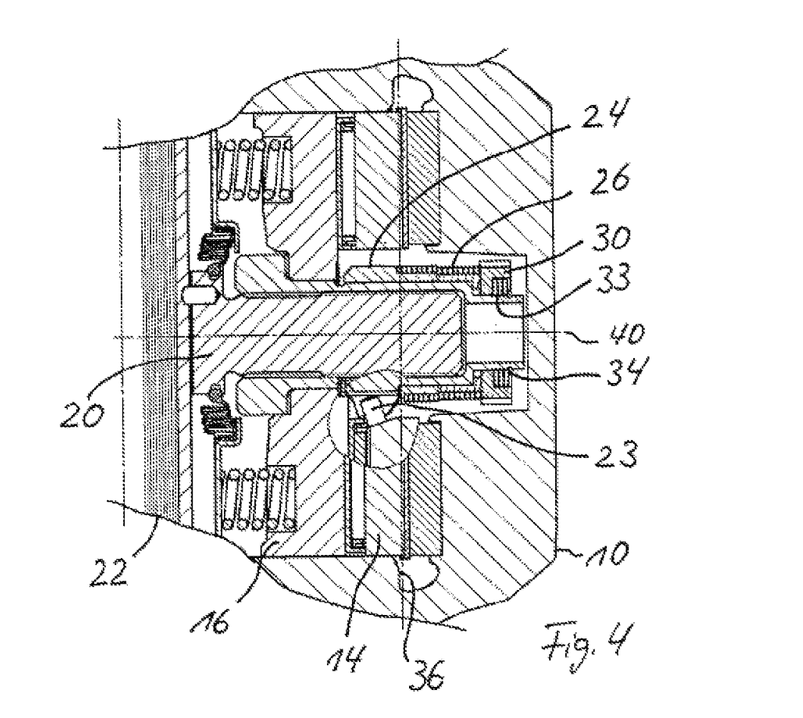

The rotational axis of the adjusting device as a whole and the driving sleeve 24 in particular is indicated by reference number 40. It stands perpendicular to the rotational axis 36 of the brake application shaft 14. The rotational axis 36 itself lies parallel to the plane of the brake disk. On the driving sleeve 24 there is formed an axial groove, indicated by reference number 42. The pin 23 engages in this axial groove 42, forming a recess, for the rotary coupling action. The two side walls 44 and 46 of the axial groove 42 are flat in the sample embodiment shown. But they can also be spherical or rounded. Each time they are configured so as to achieve an optimal stopping curve in consideration of all other conditions.

The features of the invention as disclosed in the above specification, the claims, and the drawing, can be critical by themselves or also in any given combinations to the implementing of the invention in its various embodiments. Thus, the invention can be used for brakes with one, two or more pressing screw(s)/spindle(s), with and without pressing piece. The principle of the invention also holds for adjusting devices that are set off coaxially or laterally to one or more pressing spindle(s).

The invention, moreover, concerns an adjusting device for a disk brake, especially for utility vehicles, with an adjusting element in the form of an adjusting nut or an adjusting screw and a slipping clutch to limit the torque transmitted to the adjusting element.

Adjusting devices of the kind mentioned above are known, for example, from EP 0 730 170 B1. The slipping clutch here is formed from a frictional cone on an output sleeve, on the one hand, and a pressing sleeve, on the other. In order to apply a force determining the limit torque of the slipping clutch on the output sleeve, there is a support ring, against which a compression spring thrusts, and a supporting disk, on which the compression spring exerts an elastic force. The frictional cone, serving as a torque limiting region, lies under the prestressing of the compression spring against an annular edge of the pressing sleeve. This construction may be subject to wear. Moreover, the supporting disk, supported only by a spring, is vulnerable to vibrations.

The invention is based on the problem of modifying the adjusting device of the above mentioned kind so that it is more flexible and therefore can be configured such that greater wear resistance and functional reliability are achieved.

According to the invention, the stated problem is solved in that the slipping clutch has a frictional element which is rotationally coupled to the adjusting element in both directions of turning.

In other words, the slipping clutch is no longer formed by merely using the pressing sleeve as an adjusting element in the form of an adjusting nut. Instead, a separate frictional element has been introduced, which is coupled to the adjusting element in both directions of turning. Thanks to this separate frictional element, the overall construction becomes more flexible. Thus, one can also implement a solution less prone to wear and more functionally reliable.

Thus, according to the invention, the slipping clutch includes on the one hand a bearing surface on the adjusting element and a frictional surface, for example, on an input element/output sleeve of the adjuster and, on the other hand, the separate additional frictional element. As a result, the torque being transmitted is transmitted along two paths through the slipping clutch, namely, first across the bearing surface on the adjusting element and the frictional surface, and secondly across the frictional element, which is coupled with the adjusting element in both directions of rotation. In other words, according to the invention there are two partial clutches belonging to the slipping clutch, which are switched functionally parallel to each other. Greater wear resistance and greater functional reliability can be achieved.

DE 43 23 292 A1 shows an adjusting device for a disk brake with a slipping clutch. The slipping clutch includes a ring with a serration, which is joined, unable to turn and not axially movable, to a profile shaft belonging to the adjusting device.

According to the invention, a frictional surface of the frictional element that forms part of the slipping clutch is preferably turned toward a brake disk in the installed state. In other words, the frictional surface lies "inwardly", which makes the overall layout more compact.

The frictional element according to the invention furthermore preferably has a coupling mechanism for coupling to a trimming mechanism for the adjusting element.

This coupling mechanism affords the possibility of removing the trimming mechanism, which itself is configured on the pressing sleeve according to EP 0 730 107 B1, away from the pressing sleeve, for example, placing it alongside it, so that the design length in the axial direction of the adjusting device can be shortened.

For this purpose, the coupling mechanism according to the invention preferably has a gear rim. This solution is preferred as being especially mechanically simple to realize.

In addition or as an alternative it can be provided that the coupling mechanism has an inner contour deviating from circle form on the frictional element, for example, in the form of an inner gear rim, and/or a profiling on the side of the frictional element away from the brake disk. According to this configuration, the frictional element itself constitutes the trimming mechanism, into which for example a tool adapted to the inner contour can be inserted for the trimming.

Moreover, in addition or alternatively, a profiling of the adjusting element can be provided in order to connect to an insert, a tool, or the like, used for the trimming. In this embodiment, the adjusting element is provided with a recess, for example, on its side away from the brake disk, into which an Allen wrench fits. With the Allen wrench, a trimming can be done, for example, after replacing a brake lining. Instead of the recess for an Allen wrench, there can also be provided a hexagon socket, a hexagon insert bit, a slot for a screwdriver, or the like. The tool can be applied each time for the trimming. But it can also be provided that at least part of the insert, tool, or whatever is used for the adjustment is permanently connected to the adjusting element by the profiling.

Again preferably according to the invention there is provided a prestressing mechanism for prestressing the slipping clutch in the sense of a frictional locking. The prestressing force applied by the prestressing mechanism determines the maximum torque which can be transmitted by the slipping clutch. Again preferably according to the invention, the prestressing mechanism has an elastic arrangement on the side of the frictional element away from the brake disk in the installed state.

In other words, the prestressing mechanism lies on the "outside" of the frictional element. In this way, it does not occupy any space needed for other structural parts on the "inside" of the frictional element.

The prestressing mechanism in an especially preferred embodiment of the invention has one, two or more disk springs. This configuration in turn offers the advantage of slight installation space in the axial direction. Again preferably according to the invention, a frictional surface forming part of the slipping clutch is ring-shaped. It is furthermore preferable for a frictional surface forming part of the slipping clutch to be at least partly flat, in the shape of a conical envelope surface, or serrated.

The specific configuration of the frictional surface should be adapted to the overall circumstances. Thus, for example, when a larger frictional surface is required, the frictional surface in the shape of a conical envelope surface may be the best solution. Large limit torques can be achieved with a serrated frictional surface.

Besides the adjusting device described in detail above, the invention also provides a disk brake, especially for utility vehicles, with such an adjusting device. Preferably, at least parts of the adjusting device are coupled to a pressing piece so that when force is applied its motion in the axial direction follows the brake.

While parts of the adjusting device can also be coupled to a caliper of the disk brake, a complete coupling with the pressing piece affords the advantage that caliper vibrations cannot lead to wrong adjustments. The pressing piece according to the invention preferably has a rectangular contour, in particular, it has a cross arm structure.

According to an especially preferred embodiment of the invention, a trimming mechanism is provided, whose rotational axis does not coincide with the rotational axis of the slipping clutch. In other words, the trimming mechanism is arranged almost "alongside" the slipping clutch. This configuration can serve to shorten the installation space of the brake in the axial direction.

In what follows, the invention is further explained by means of a preferred sample embodiment making reference to the enclosed drawing with further details. There are shown FIG. 5 a sectional view of a utility vehicle disk brake according to a preferred sample embodiment of the invention, FIG. 6 another sectional view of the brake of the invention, with further details, and FIG. 7 an axial view of a frictional element of the brake of FIG. 6.

Figure 5:
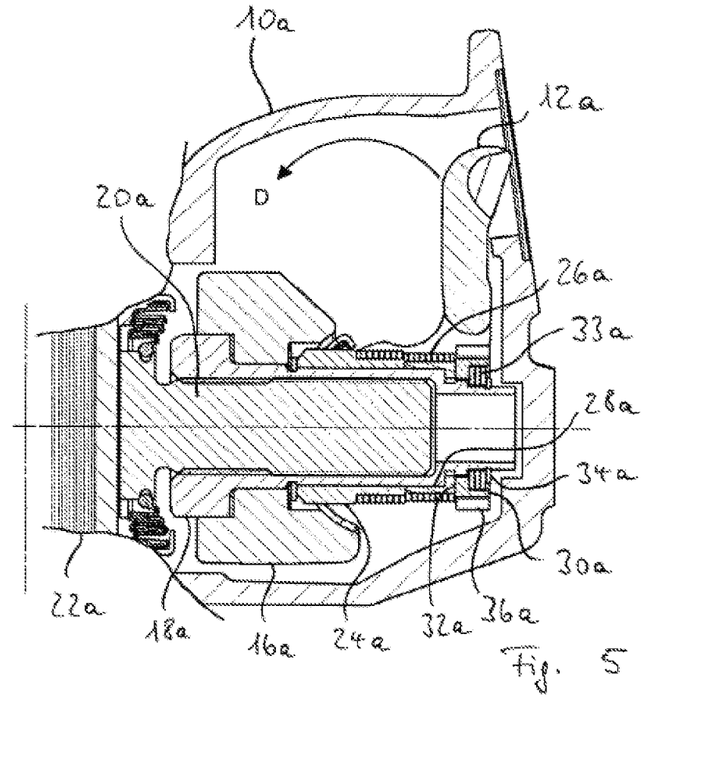
FIG. 5 a sectional view of a utility vehicle disk brake according to a preferred sample embodiment of the invention, FIG. 6 another sectional view of the brake of the invention, with further details, and FIG. 7 an axial view of a frictional element of the brake of FIG. 6.
Figure 6:
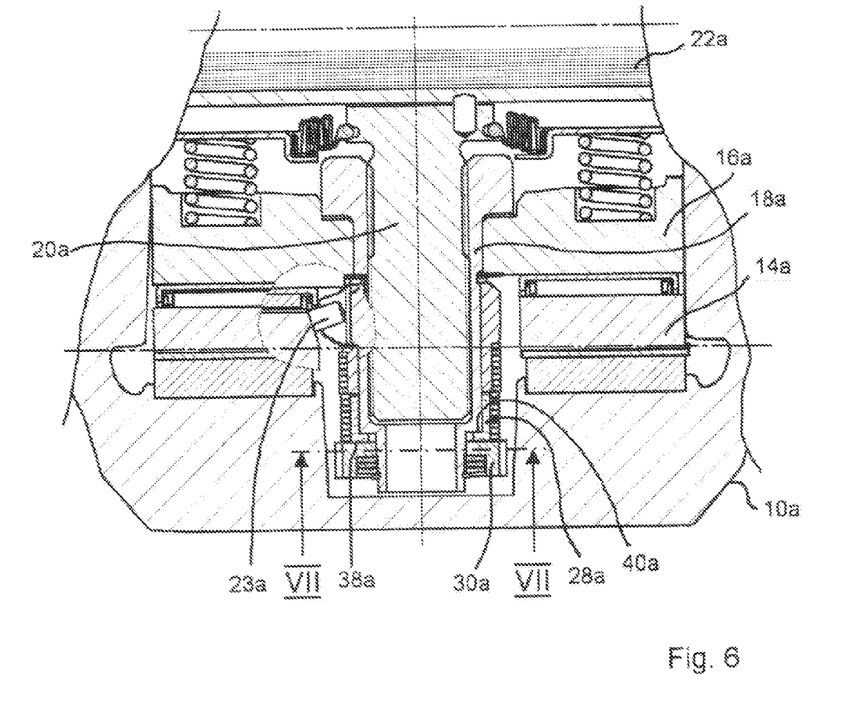
Figure 7:
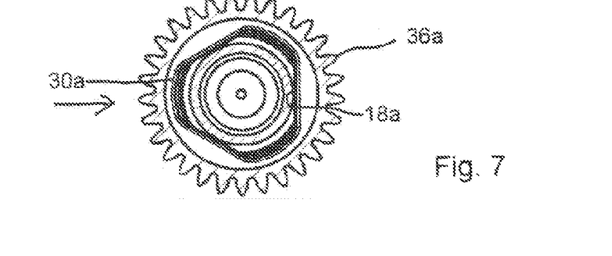

FIGS. 5 to 7 show a disk brake. It has a caliper 10*a*. Moreover, it has a brake application device, which includes a pivoting lever 12*a* with a brake shaft 14*a*. If the pivoting lever is moved in the direction "D", it exerts pressure on a pressing piece 16*a*, which forms a cross arm of the brake. The pressing piece 16*a*, in turn, presses against a pressing sleeve 18*a*, which then transmits the applied force across a pressing screw 20*a* to a brake lining 22*a*. Therefore, when the pivoting lever 12*a* is activated, the brake lining 22*a* is pressed against a brake disk, not shown in the drawing.

By means of a pin 23*a*, a driving sleeve 24*a* is coupled to the brake shaft 14*a* so that a swinging of the pivoting lever 12*a* after overcoming a clearance results in a twisting of the driving sleeve 24*a*. The longitudinal axis of the pin 23*a* is slanting with respect to the rotational axis of the brake shaft 14*a*, for example, by 18°. Thanks to the improved transmission ratio achieved in this way, a higher degree of adjustment per each activation of the brakes is achieved. The driving sleeve 24*a* is coupled by a wrap spring 26*a*, acting as a one-way clutch, to an output sleeve 28*a*. In this way, the output sleeve 28a is also twisted when force is applied. The output sleeve 28a together with a support disk 30a forms a slipping clutch. For this, the support disk 30a thrusts by its "inwardly" directed frictional surface 32a against the output sleeve 28a. The output sleeve 28a, in turn, thrusts by a frictional surface 40a (here, flat) in this sample embodiment against a bearing surface 38a of the pressing sleeve 18a. Three disk springs 33a, thrusting against a retaining ring 34a, serve to provide prestressing.

The support disk 30a has an inner contour deviating from a circle shape per FIG. 7, being somewhat star-shaped in the sample embodiment shown, while the outer contour of the pressing sleeve 18a in the place where the support disk 30a sits has a complementary outer contour, so that the support disk 30a is rotationally coupled with the pressing sleeve 18a in both directions.

Because of the above individually described couplings of the individual structural parts with each other, a swinging of the brake lever 12a in the direction "D" after overcoming the clearance brings about a twisting of the pressing sleeve 18a, which is screwed together with the pressing screw 20a that is held firm against rotation, so that the pressing screw 20a is backed off from the pressing sleeve 18a to the left in FIG. 5.

But this backing off only occurs until the brake lining 22a thrusts against the brake disk. Then, if further force is applied, the friction between the pressing piece 16a and the pressing sleeve 18a increases, so that the pressing sleeve 18a can no longer turn further. The frictional torque inside the screw connection between the pressing sleeve 18a and the pressing screw 20a that occurs with increasing pressure works in similar fashion. Therefore, upon further swinging of the pivoting lever 12a in direction "D", the output sleeve 28a slips relative to the support disk 30a and the pressing sleeve 18a. Thus, no further backing off of the pressing screw 20a from the pressing sleeve 18a occurs.

The construction described in detail above is known in technical terms as a force, load or torque-dependent adjustment, because according to the above remarks an adjustment occurs only until the force, the load or the torque exceeds a value, depending on the configuration of the frictional locking, that can be transmitted between the output sleeve 28a, on the one hand, and the support disk 30a and the pressing sleeve 18a, on the other hand. This value can, in particular, be dictated by appropriate dimensioning of the disk springs 33a.

When the brake is released, i.e., when the pivoting lever 12a swings opposite the swinging direction "D", the pressing screw 20a does not move back into the pressing sleeve 18a by the twisting of the pressing sleeve 18a, because the wrap spring 26a is decoupled in this direction of turning. Therefore, the wrap spring 26a constitutes a direction-dependent component of the adjusting linkage, while the support disk 30a with its frictional surface 32a ensures the torque dependency of the adjusting linkage.

The support disk according to FIG. 7 is provided with a gear rim 36a on its outer edge. The gear rim 36a engages in the installed state with a trim shaft, not shown in the drawing. The trim shaft thus lies almost "alongside the actual adjusting device, which has the advantage of a shorter axial installation length. The trim shaft can have a hexagonal head, for example. In order to assure accessibility of the hexagonal head for the trimming by means of an appropriate tool, a work opening likewise not shown in the drawing is provided on the caliper 10a. The work opening can be closed by a plug to protect against fouling.

The trim shaft serves, for example, to turn the support disk 30a and the rotationally coupled pressing sleeve 18a in order to screw the pressing screw 20a back into the pressing sleeve 18a, for example, after replacing the brake lining 22a.

In addition or as an alternative, however, the support disk 30a itself can serve as a trimming element. For this, it can have an inner contour deviating from the circle shape and/or a profiling on the side away from the brake disk, into which an appropriate tool can be inserted for the trimming. Also, for this purpose, a corresponding work opening will be provided in such a case on the caliper 10a, which can again be closed by a plug. It is also possible to apply a trimming tool, an insert, or the like directly on the pressing sleeve 18a, or to couple it with the latter.

As the above remarks show, the support disk 30a has various functions:

On the one hand, it forms part of the slipping clutch to limit the torque that can be transmitted. It therefore ensures the torque dependency of the adjusting device, which is sometimes also called force or load dependency in the literature. Moreover, the support disk 30a serves for coupling of the pivoting lever 12a, accomplishing the force application, with the adjusting device, because it sits on the pressing sleeve 18a firm against rotation and can therefore transmit torques. Finally, it serves to create the possibility of placing the trim shaft "alongside" the actual adjusting device, thereby ensuring that the trim shaft does not increase the axial installation length.

In this place, however, it should be expressly pointed out that the invention also includes solutions without such a trim shaft alongside the actual adjusting device. Thus, for example, the support disk 30a can have an inner contour deviating from the circle shape, so that after applying an appropriate tool a trimming of the adjusting mechanism can be done directly on the support disk 30a. This also holds for the case of a trim coupling that engages with the adjusting element.

The features of the invention disclosed in the above specification, the claims, and the drawing can be critical by themselves or also in any given combinations to the implementing of the invention in its various embodiments. Thus, the invention can be used for brakes with one, two or more pressing screw(s)/spindle(s), as well as brakes with and without pressing piece.

What is claimed is:

1. An adjusting device for a disk brake, including:
   an adjusting element in the form of a threaded element; and
   a slipping clutch to limit a torque which is transmittable to the adjusting element,
   wherein the slipping clutch includes a frictional element, which is rotationally coupled to the adjusting element in both directions of turning,
   wherein the frictional element is disposed co-axially with the adjusting element and is coupled with the adjusting element by locking of an inner contour of the frictional element with a corresponding outer contour of the adjusting element, wherein the inner contour of the frictional element deviates at least in some areas from a circle-shaped form, and the corresponding outer contour of the adjusting element complements the inner contour in an area of placement of the frictional element, to provide for rotational coupling of the frictional element and the adjusting element in both directions of turning.

2. The adjusting device according to claim 1, wherein a frictional surface of the frictional element that forms part of the slipping clutch is turned toward a brake disk in the installed state.

3. The adjusting device according to claim 1, wherein the frictional element has a coupling mechanism for coupling to the adjusting element.

4. The adjusting device according to claim 3, wherein the coupling mechanism includes a gear rim.

5. The adjusting device according to claim 3, wherein the coupling mechanism includes an inner contour deviating from a circle-shaped form.

6. The adjusting device according to claim 3, wherein the coupling mechanism includes a profiling on the side of the frictional element away from a brake disk.

7. The adjusting device according to claim 1, wherein the adjusting element is profiled to connect to a trimming tool.

8. The adjusting device according to claim 1, including a prestressing mechanism for prestressing the slipping clutch in a frictional locking.

9. The adjusting device according to claim 8, wherein the prestressing mechanism has an elastic arrangement on a side of the frictional element away from a brake disk in the installed state.

10. The adjusting device according to claim 8, wherein the prestressing mechanism includes one or more disk springs.

11. The adjusting device according to claim 1, wherein the slipping clutch includes a ring-shaped part forming a frictional surface.

12. The adjusting device according to claim 11, wherein the frictional surface forming part of the slipping clutch is at least partly flat, in a shape of a conical envelope surface, or serrated.

13. The adjusting device according to claim 1, wherein the adjusting device is included in a disk brake configured for use in a utility vehicle.

14. A disk brake, including an adjusting device that includes:
- an adjusting element in the form of a threaded element; and
- a slipping clutch to limit a torque which is transmittable to the adjusting element,
- wherein the slipping clutch includes a frictional element, which is rotationally coupled to the adjusting element in both directions of turning,
- wherein the frictional element is disposed co-axially with the adjusting element and is coupled with the adjusting element by locking of an inner contour of the frictional element with a corresponding outer contour of the adjusting element, wherein the inner contour of the frictional element deviates at least in some areas from a circle-shaped form, and the corresponding outer contour of the adjusting element complements the inner contour in an area of placement of the frictional element, to provide for rotational coupling of the frictional element and the adjusting element in both directions of turning.

15. The disk brake according to claim 14, wherein at least parts of the adjusting device are coupled to a pressing piece so that when force is applied a motion of the adjusting device in an axial direction follows the brake.

16. The disk brake according to claim 15, wherein the pressing piece has a rectangular contour.

17. The disk brake according to claim 15, wherein the pressing piece forms a cross arm of the brake.

18. The disk brake according to claim 17, further including a trim shaft, with a rotational axis that does not coincide with a rotational axis of the slipping clutch.

19. The disk brake according to claim 14, wherein the disk brake is configured for use in a utility vehicle.

\* \* \* \* \*